United States Patent
Race

(10) Patent No.: US 6,709,201 B2
(45) Date of Patent: Mar. 23, 2004

(54) GROOVED RETAINING WALL BLOCK AND SYSTEM

(75) Inventor: Robert J. Race, Eagan, MN (US)

(73) Assignee: Keystone Retaining Wall Systems, Inc., Bloomington, MN (US)

(*) Notice: Subject to any disclaimer, the term of this patent is extended or adjusted under 35 U.S.C. 154(b) by 0 days.

(21) Appl. No.: 10/357,982

(22) Filed: Feb. 4, 2003

(65) Prior Publication Data

US 2003/0118410 A1 Jun. 26, 2003

Related U.S. Application Data

(62) Division of application No. 09/904,037, filed on Jul. 12, 2001, now Pat. No. 6,536,994.

(51) Int. Cl.[7] .............................................. E02D 29/02
(52) U.S. Cl. .................... 405/262; 405/284; 405/286; 403/381
(58) Field of Search ............................... 403/381, 354, 403/360; 405/284, 286, 262, 302.4, 302.6, 302.7

(56) References Cited

U.S. PATENT DOCUMENTS

| | | | |
|---|---|---|---|
| 4,914,876 A | 4/1990 | Forsberg |
| 4,920,712 A | 5/1990 | Dean, Jr. |
| 5,044,834 A | 9/1991 | Janopaul, Jr. |
| RE34,314 E | 7/1993 | Forsberg |
| 5,267,816 A | 12/1993 | Mercer et al. |
| 5,417,523 A | 5/1995 | Scales |
| 5,560,172 A | 10/1996 | Brophy et al. |
| 5,642,592 A | 7/1997 | Andres |
| 5,788,420 A | 8/1998 | Scales |
| 5,911,539 A | 6/1999 | Egan et al. |
| 5,913,790 A | 6/1999 | Dawson |
| 5,951,210 A | 9/1999 | Maguire et al. |
| 6,019,550 A | 2/2000 | Wrigley et al. |
| D435,304 S | 12/2000 | Rainey |
| 6,168,351 B1 | 1/2001 | Rainey |

FOREIGN PATENT DOCUMENTS

| | | | |
|---|---|---|---|
| GB | 2313867 | * 12/1997 |
| WO | WO 97/44533 | 11/1997 |
| WO | WO 00/22243 | 4/2000 |

OTHER PUBLICATIONS

US 6,089,793, 7/2000, Rainey (withdrawn).
Anchor Landmark System product brochure ©2000.

* cited by examiner

Primary Examiner—Heather Shackelford
Assistant Examiner—Sunil Singh
(74) Attorney, Agent, or Firm—Popovich, Wiles & O'Connell, P.A.

(57) ABSTRACT

Connectors for use in a retaining wall and a retaining wall having grooved blocks configured to receive the connector. Connectors can be used in various orientations within the grooves of the blocks. In a retaining wall, a flexible geosynthetic material fits into a channel of a channel connector, and is held in place by an elongate bar. The connector prevents abrasion of geosynthetic material. The connector can also be a plurality of spaced-apart projections for use with an apertured, relatively rigid geogrid. The connectors hold geogrid firmly in place, providing for increased connection capacity.

6 Claims, 14 Drawing Sheets

GROOVED RETAINING WALL BLOCK AND SYSTEM

This application is a divisional application of U.S. Ser. No. 09/904,037, filed Jul. 12, 2001, now U.S. Pat. No. 6,536,994, hereby incorporated herein by reference in its entirety.

FIELD OF THE INVENTION

The present invention relates to a retaining wall block system for use with soil reinforcement materials, such as a geogrid. In particular, this invention relates to a retaining wall block and connectors used with geosynthetic materials.

BACKGROUND OF THE INVENTION

Numerous methods and materials exist for the construction of retaining walls. Such methods include the use of natural stone, poured in-place concrete, pre-cast concrete, masonry, and landscape timbers or railroad ties. In recent years, segmental concrete retaining wall units which are dry stacked (i.e., built without the use of mortar) have become a widely accepted product for the construction of retaining walls.

Many retaining wall systems described in the art include the use of reinforcing materials, also referred to as geogrids, geosynthetic reinforcement, or geogrid tie-backs.

Reinforcement materials may be inextensible, such as steel mesh, or extensible geosynthetic materials, such as mats and oriented polymeric materials. For example, flat polymeric sheets are used to form geogrids by forming holes in the sheets and then drawing them to orient the polymer and increase the modulus. Such polymeric materials include high density polyethylene (HDPE) and these materials form relatively rigid geogrids commercially available under the trade designation "TENSAR".

While the HDPE materials are relatively rigid, a second type of geosynthetic material is a generally more flexible. These may comprise rectilinear polymer constructions characterized by large (e.g., 1 inch (25 cm) or greater) openings. In these open structure geogrids, polymeric strands are woven or "welded" (by means of adhesives and/or heat) together in a grid. Polymers used for making relatively flexible geogrids include polyester fibers. The polyester typically is coated with a polyvinyl chloride (PVC) or a latex topcoat. The coating may contain carbon black for ultraviolet (UV) stabilization. Some open structure geogrids comprise polyester yarn for the warp fibers and polypropylene as the fill fibers. Another flexible reinforcing geosynthetic material is fabric, i.e., woven constructions without large openings. These fabrics typically comprise polymers and are referred to as geofabrics. The geofabric can be laid between courses of blocks in a wall, and typically is tied into the wall and held there. When blocks are configured to have pin connectors, for example, a hole or slit is formed in the geofabric at the construction site and the geofabric is held on the blocks by fitting it over the pins.

A geogrid with an open structure, either the relatively rigid HDPE geogrids or the relatively flexible open structured geosynthetic materials also can be hooked onto a block or blocks by means of pins. Alternatively, rake-shaped connector bars can be used with a block with the prongs of the connector extending through the openings in the geogrid. However the geogrid connects to the block, the geogrid extends behind the retaining wall and ties into the earth behind the wall, thus increasing the structural strength of the wall.

For example, after placement of a course of blocks to the desired height, geosynthetic material is placed onto a course of blocks and held in place by means of pins in the block (which may have a primary function of holding blocks together) or by means of special connectors. The geosynthetic material is put under tension by pulling back and staking the geosynthetic material behind the retaining wall. Backfill is placed and compacted over the geosynthetic material. Construction of the wall continues and may include another layer of geosynthetic material.

There are some disadvantages in the use of both the rigid HDPE and the flexible polymer geosynthetic materials, including PVC-coated polyester geogrids and polyester woven fabrics. For HDPE geogrids and the flexible polyester geogrids or geofabrics, there typically is low connection capacity between the geogrid and the wall, as present systems rely mainly on friction to hold the geogrid in place. Friction between a block and a flexible geogrid or geofabric can result in abrasion and damage.

A need in this art is a retaining wall block system that will provide for stronger connection of the geosynthetic material to the block wall. Such a system would provide for greater ease of handling during installation of the geosynthetic material. A better connection method would also permit the use of relatively low cost, low strength polymer geogrids and geofabrics without damage to the geogrid during installation or use.

SUMMARY OF THE INVENTION

A retaining wall block system comprising a grooved block and a connector for use with a geogrid. In one embodiment, the connector is a channel connector configured to be used with flexible geosynthetic material, such as fabric or open structure polymer grids. The advantage to this connector is that it prevents damage to the fabric by abrasion from the blocks in the wall. In another embodiment, the connector comprises a plurality of spaced-apart projections adapted to be used with an apertured, relatively rigid geogrid. The connector holds the geogrid firmly in place, providing for increased connection capacity.

In one aspect, this invention is a connector for engaging a geosynthetic material used for stabilizing a wall formed from a plurality of wall blocks having a top surface defining a groove, the connector comprising an elongate channel portion having first and second sides defining a channel therebetween; and an elongate bar configured to engage a section of the geosynthetic material within the channel, the channel portion and bar being sized to be accommodated within the groove of at least one block.

The connector may comprise polyvinyl chloride or polyethylene copolymer. One of the first and second sides of the elongate channel portion may face the top surface of the block, or the channel may open onto the top surface of the block.

In a second aspect, this invention is a retaining wall comprising a plurality of blocks including at least one lower course and at least one upper course, at least one block having a top surface defining a groove, the groove being substantially perpendicular to a vertical plane of symmetry; a geosynthetic material; and a connector including a channel portion having first and second sides defining a channel therebetween and an elongate bar configured to engage a section of the geogrid within the channel, the connector being sized to be accommodated within the groove of the at least one block when the geogrid is engaged in the channel. The geosynthetic material may comprise fabric. The connector may be sized to be accommodated within the grooves of at least two adjacent blocks in one course of the plurality of blocks.

In a third aspect, this invention is a retaining wall comprising a plurality of blocks including at least one lower course and at least one upper course, each block of the plurality of blocks having opposing front and rear faces, at least a portion of the front face being substantially parallel to the rear face, the at least one block having a top surface defining a groove, the groove being substantially parallel to the rear face; a geosynthetic material; and a connector including a channel portion having first and second sides defining a channel therebetween and an elongate bar configured to engage a section of the geogrid within the channel, the connector being sized to be accommodated within the groove of the at least one block when the geogrid is engaged in the channel.

In a fourth aspect, this invention is a connector for engaging an apertured geogrid used for stabilizing a retaining wall formed from a plurality of wall blocks having a top surface defining a groove, the connector comprising: a base portion; a plurality of spaced-apart projections extending from the base portion, each projection including a top portion and a spacing portion intermediate the base portion and the top portion, each spacing portion having a first width, each top portion having a second width, the second width being greater than the first width, the projections being spaced and sized to be accommodated within apertures of the geogrid, the base portion and projections being sized to be accommodated within the groove of at least one block. The plurality of spaced-apart projections may be four spaced-apart projections. The apertured geogrid may comprise high density polyethylene.

In a fifth aspect, this invention is a retaining wall comprising a plurality of blocks including at least one lower course and at least one upper course, at least one block having a top surface defining a groove, the groove being substantially perpendicular to a vertical plane of symmetry; an apertured geogrid; and a connector including a base portion and a plurality of spaced-apart projections extending from the base portion, each projection including a top portion and a spacing portion intermediate the base portion and the top portion, each spacing portion having a first width, each top portion having a second width, the second width being greater than the first width, the projections being spaced and sized to be accommodated within apertures of the geogrid, the base portion and projections being sized to be accommodated within the groove of at least one block when the connector is engaged in the apertured geogrid.

In a sixth aspect, this invention is a retaining wall comprising a plurality of blocks including at least one lower course and at least one upper course, each block of the plurality of blocks having opposing front and rear faces, at least a portion of the front face being substantially parallel to the rear face, the at least one block having a top surface defining a groove, the groove being substantially parallel to the rear face; an apertured geogrid; and a connector including a base portion and a plurality of spaced-apart projections extending from the base portion, each projection including a top portion and a spacing portion intermediate the base portion and the top portion, each spacing portion having a first width, each top portion having a second width, the second width being greater than the first width, the projections being spaced and sized to be accommodated within apertures of the geogrid, the base portion and projections being sized to be accommodated within the groove of at least one block when the connector is engaged in the apertured geogrid.

BRIEF DESCRIPTION OF THE DRAWINGS

A preferred form of the present invention will now be described by way of example with reference to the accompanying drawings, wherein.

DETAILED DESCRIPTION OF THE PREFERRED EMBODIMENTS

In this application, "upper" and "lower" refer to the placement of the block in a retaining wall. The lower surface faces down, that is, it is placed such that it faces the ground. In forming a retaining wall, one row of blocks is laid down, forming a course. A second course is laid on top of this by positioning the lower surface of one block on the upper surface of another block.

The Figures describe various block embodiments. Many elements in various block embodiments are identical in shape, size, relative placement, and function, and therefore the numbers for these elements do not change. Elements that vary from one block embodiment to another are denoted by suffices "a", "b", "c", and may be referred to in a general way by a number without its suffix.

The blocks of this invention preferably are symmetrical about a vertical plane of symmetry. In preferred embodiments, at least a portion of the front face is substantially parallel to the rear face of the block. The blocks of this invention are provided with pin holes, pin receiving cavities, and at least one core which serve to decrease the weight of the block while maintaining its strength. The various cavities also provide ease of construction of a retaining wall. The location, shape, and size of the pin holes and pin receiving cavities are selected to maximize the strength of the block. The top face of the block is provided with a groove configured to receive a connector for use with a geogrid. The groove is substantially parallel to the rear face of the block.

Figure 1:
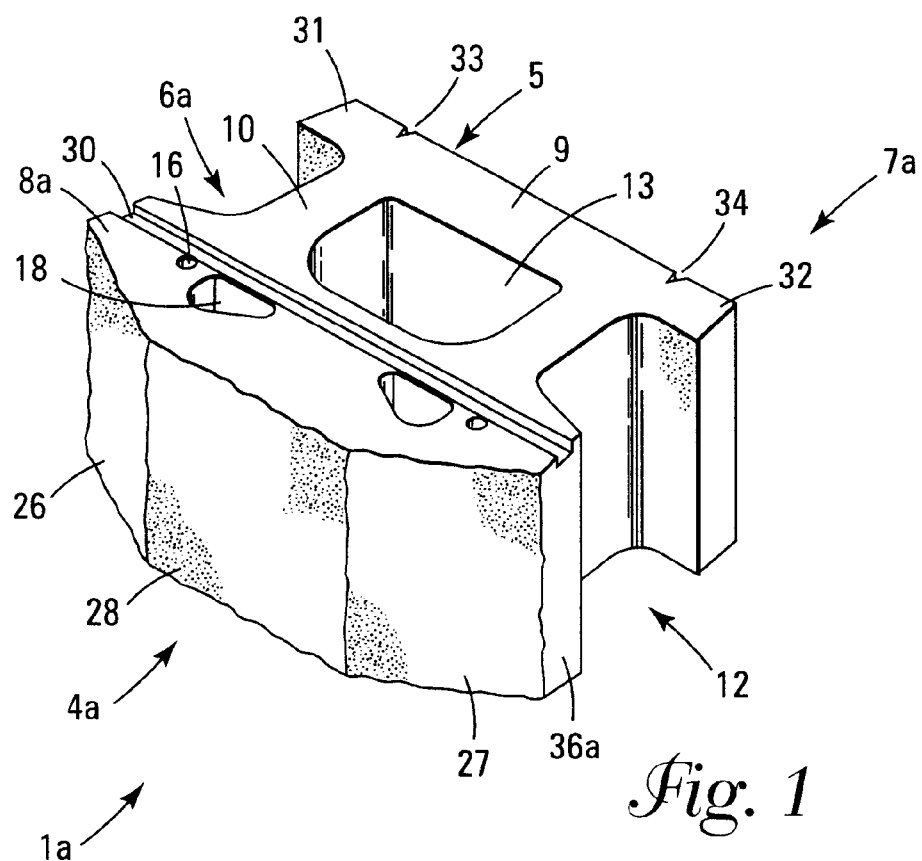
FIG. 1 is a perspective view of a preferred embodiment of the retaining wall block of this invention.
Figure 2:
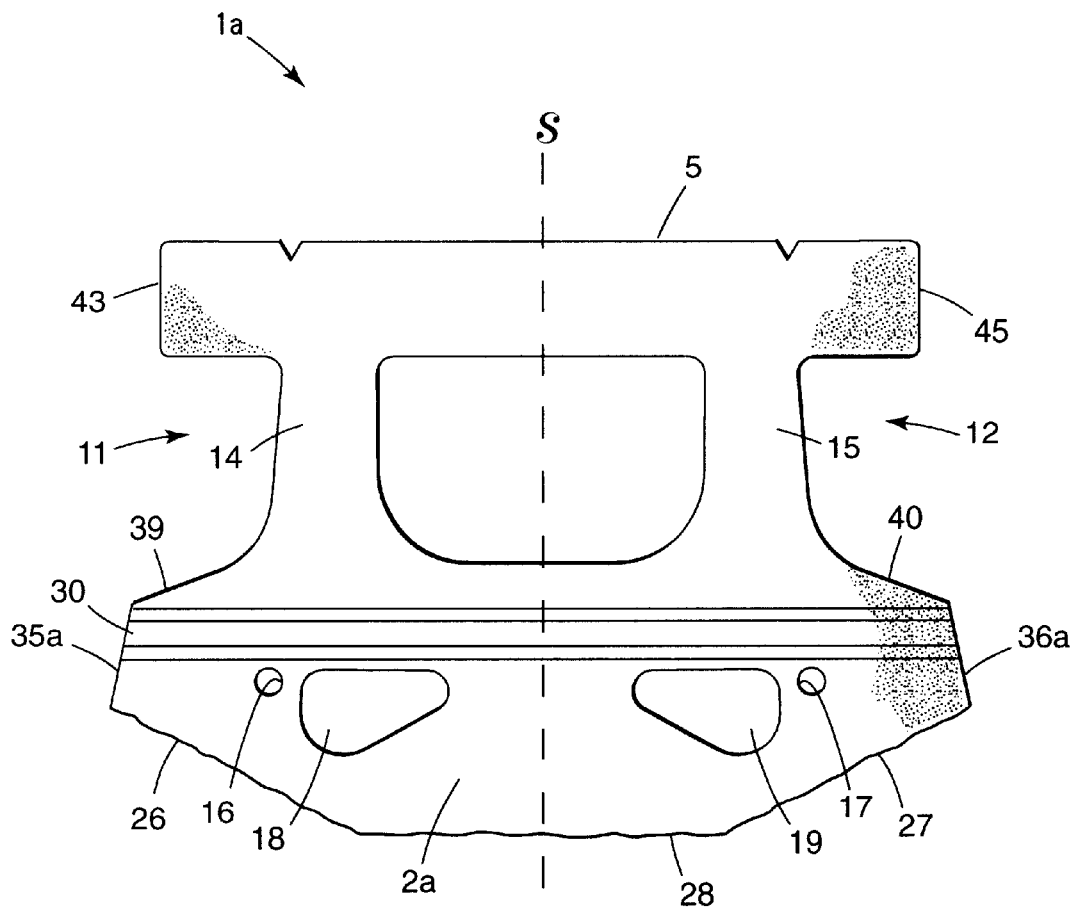
FIG. 2 is a top view of the retaining wall block of FIG. 1.
Figure 3:
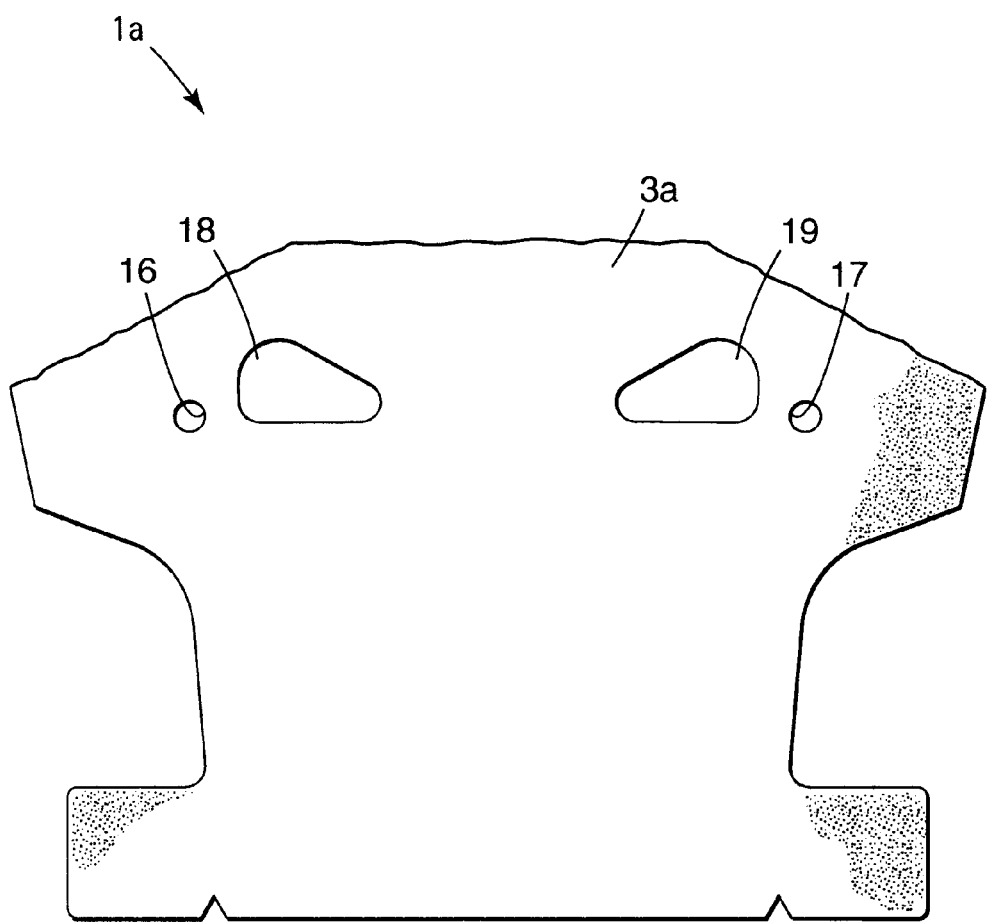
FIG. 3 is a bottom view of the retaining wall block of FIG. 1.

Block 1a is shown in FIGS. 1 to 5. Block 1a is made of a rugged, weather resistant material, preferably (and typically) zero-slump molded concrete. Other suitable materials include plastic, reinforced fibers, wood, metal and stone. Block 1a has parallel top face 2a and bottom face 3a, front face 4a, rear face 5 and first and second side wall faces 6a and 7a. Front face 4a and rear face 5 each extend from top face 2a to bottom face 3a and side wall faces 6a, 7a and extend from top face 2a to bottom face 3a and from front face 4a to rear face 5. Block 1a has vertical plane of symmetry S, as indicated in FIG. 2. Top face 2a has groove 30, which is configured to receive a connector for use with a reinforcing geogrid, as described further below. Groove 30 has a length that is defined as the distance from side wall 6a to sidewall 7a.

Front face 4a of block 1a is formed of angled outer surfaces 26 and 27 and central surface 28 disposed perpendicular to plane of symmetry S so as to provide for a multi-faceted front face on a wall constructed of the blocks. Central surface 28 of front face 4a is substantially parallel to rear face 5.

Block 1a comprises body portion 8a, head portion 9 and neck portion 10 connecting body portion 8a and head portion 9. Front face 4a forms part of body portion 8a, while rear face 5 forms part of head portion 9. The body, head and neck portions 8a, 9, and 10 each extend between top and bottom faces 2a and 3a and between first and second sidewall faces 6 and 7. Side wall faces 6 and 7 are thus of a compound shape and define side voids 11 and 12 between body and head portions 8a and 9 either side of neck portion 10 as a result of the reduced width of neck portion 10 compared to that of body and head portions 8a and 9.

Angled outer surfaces 26 and 27 of front face 4a join side portions 35a and 36a, respectively, of sidewalls 6 and 7 thus forming corners 20a and 21a. Side portions 35a and 36a are also angled (i.e., converging toward the rear face) extending from the front face inwardly toward the rear face. Side portions 35a and 36a adjoin shoulders 39 and 40 of body portion 8a.

Notches 33 and 34 are provided along rear face 5 to allow the user to remove ears 31 and 32 by conventional splitting techniques. Removal of a portion of the rear face may be desirable in the formation of curved walls. Preferably, side wall portions 43 and 45 of side walls 6 and 7 are substantially perpendicular to rear face 5, although the side wall portions may angle toward the rear face.

Figure 4:
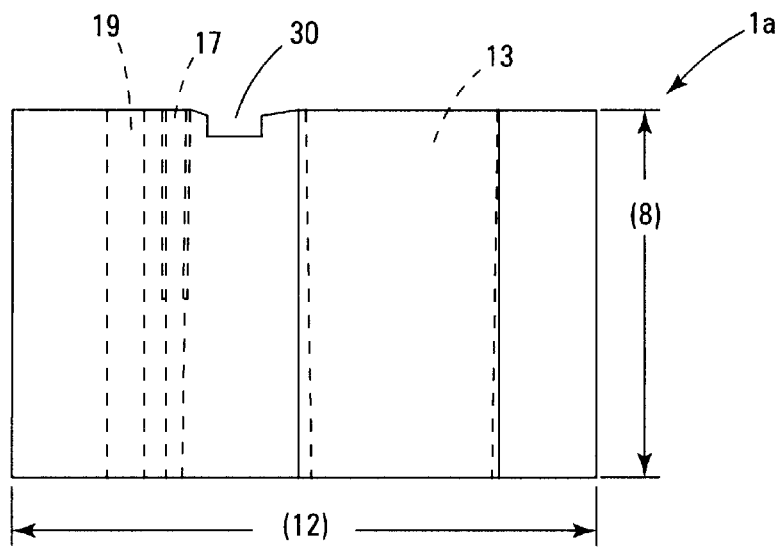
FIG. 4 is a side view of the block of FIG. 1.
Figure 5:
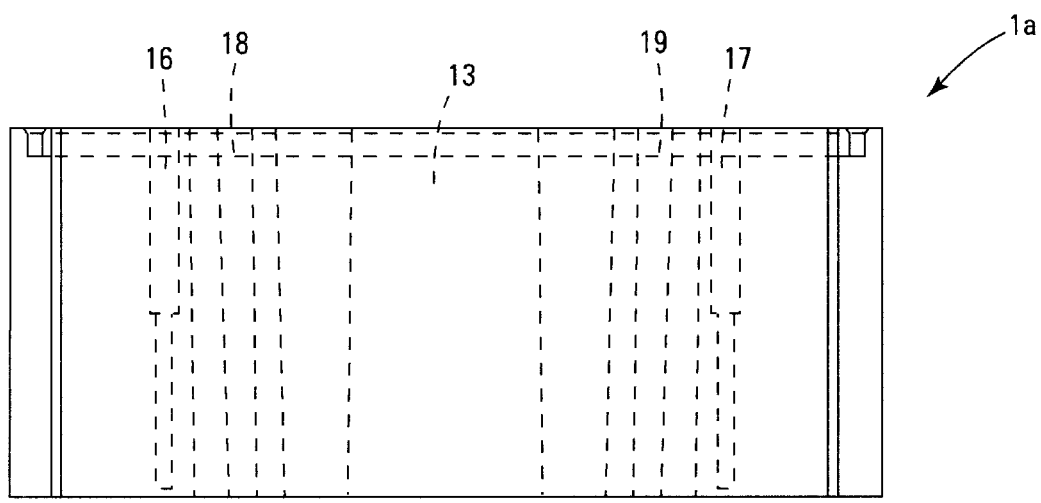
FIG. 5 is a front view of the block of FIG. 1.

FIGS. 4 and 5 illustrate side and front views, respectively, of block 1a. The core and pin receiving cavities are shown in outline. FIGS. 4 and 5 show that opening or core 13 extends through neck portion 10 from top face 2a to bottom face 3a. Core 13 divides neck portion 10 into first and second neck wall members 14 and 15 which extend to the rear of the block (i.e., from body portion 8a to head portion 9). Core 13 and side voids 11 and 12 also reduce the weight of block 1a. A lower weight block is both a manufacturing advantage and an advantage when constructing a wall from the blocks.

First and second pin receiving cavities 18 and 19 are disposed in body portion 8a and extend between top and bottom faces 2a and 3a, i.e., opening onto both top and bottom surfaces. Cavities 18 and 19 are referred to as "kidney shaped", that is, the cavities are curvilinear, having no sharp angles. The shape and size and location of the cavities are selected to maximize the strength of the block while at the same time, since they extend between the top and bottom surfaces, the block weight is minimized. The cavities may be tapered, for ease of manufacturing. That is, the area of the kidney shape in the top of the block preferably is slightly larger than the area of the kidney shape in the bottom of the block.

Pin receiving cavities 18 and 19 preferably extend all the way through the blocks. This is an advantage because the blocks are formed, unmolded, and used with the top surface facing up. Therefore, they do not need to be flipped over by an installer when a retaining wall is built. Further, installation is simplified since the installer can see the pin in a block in a lower course through the pin receiving cavity of a block in an upper course, thus making alignment easier.

Also disposed in body portion 8a are first and second pin holes 16 and 17 adjacent cavities 18 and 19, respectively, positioned away from the cavities toward side portions 35a and 36a. The first and second pin holes are also slightly to the rear of the pin receiving cavities. The location of the pin holes relative to the cavities is discussed further below.

Pin holes typically extend through to bottom face 3a and are sized to receive pin 50. In forming a wall from the blocks, a pin in a pin hole is installed and projects from the top face of an underlying block by, for example, approximately 20 mm to engage the pin receiving cavity of an overlying block. In this manner, the pin in a block on a lower course of blocks in a wall engages a pin receiving cavity of a block in an upper course. This results in an interlocking of the blocks with a predetermined setback in the same general manner as that described U.S. Pat. No. Re. 34,134 (Forsberg).

Though the blocks illustrated in the Figures may have various dimensions, block 1a, illustrated in FIGS. 1 to 5, typically has a thickness (i.e., the distance between surfaces 2a and 3a) of about 8 inches (20.3 cm) and a width (i.e., the distance from corner 20a to corner 21a) of about 18 inches (45.7 cm).

Figure 6:
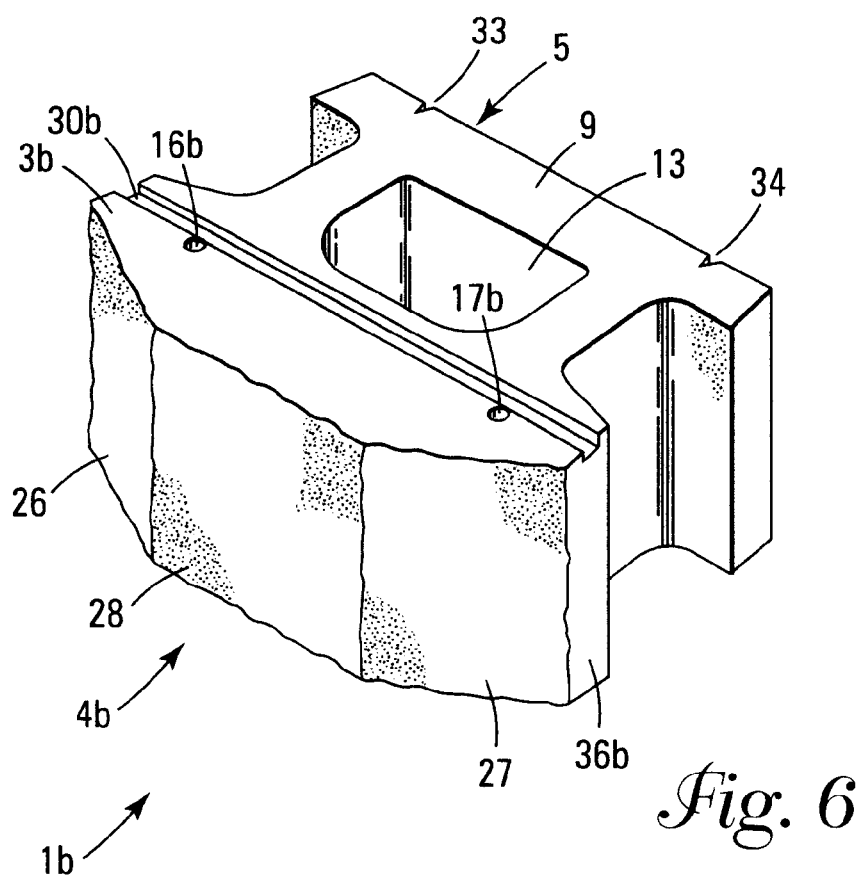
FIG. 6 is a perspective view of an alternate embodiment of the retaining wall block of this invention.

FIG. 6 illustrates an alternate embodiment of a retaining wall block. Block 1b has substantially the same shape and features as block 1a, but the pin receiving cavities open onto the bottom of the block and do not go all the way through the thickness of the block. Pin holes 16b and 17b are provided. Groove 30b is provided and is configured to be used with a geogrid connector, as described further below.

Figure 7:
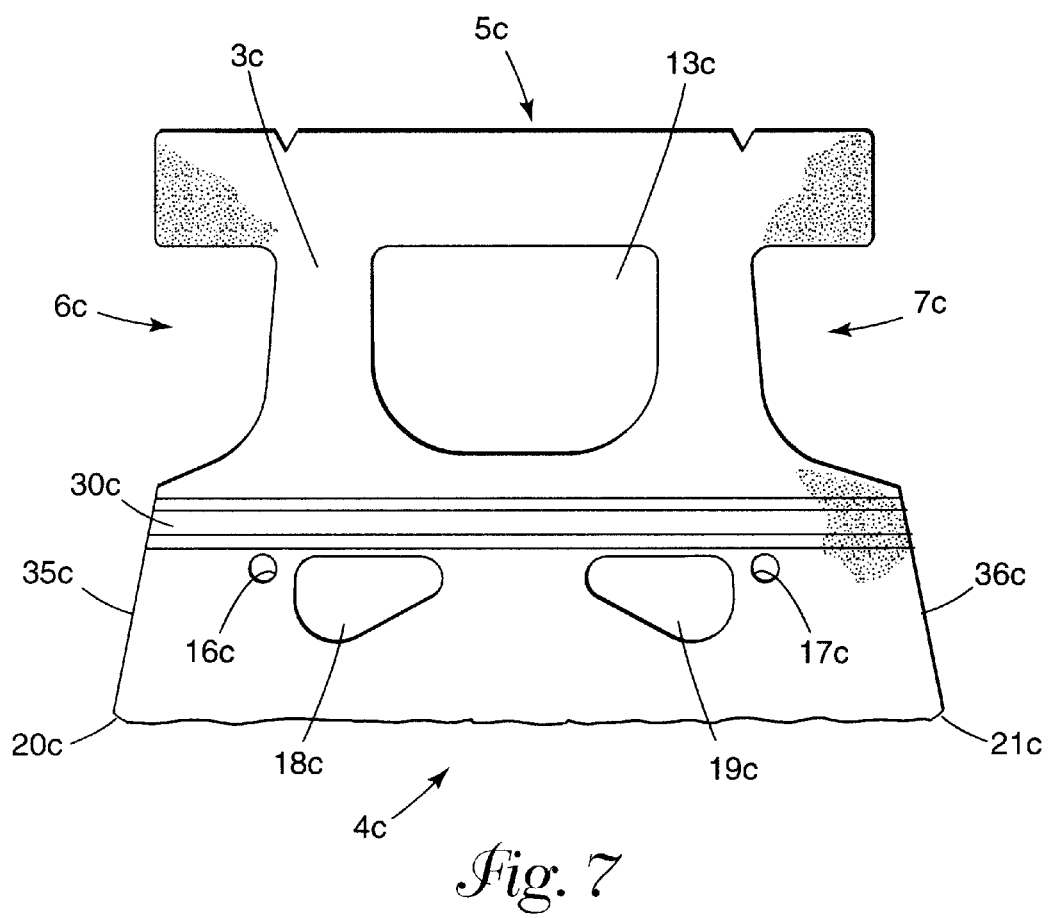
FIG. 7 is a top view of another alternate embodiment of the retaining wall block of this invention.

FIG. 7 illustrates the top view of another embodiment of the retaining wall block. Block 1c of FIG. 7 is substantially similar to the block of FIGS. 1 to 5, except that front face 4c of block 1c is straight, and has no angled portion. Front face 4c of block 1c adjoins side wall surfaces 35c and 36c at corners 20c and 21c.

Figure 8A:
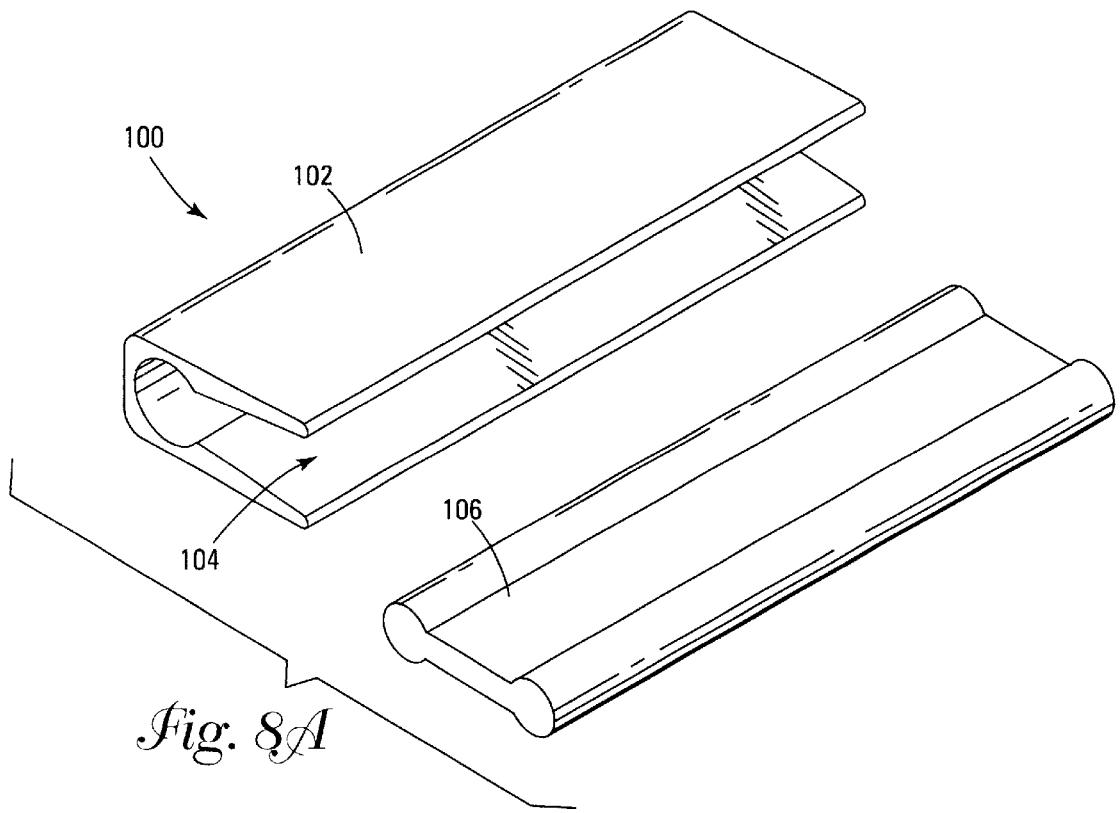
FIG. 8A is a perspective view of the channel connector of this invention.
Figure 8B:
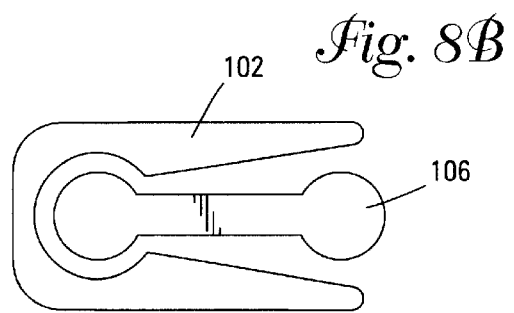
FIG. 8B is a cross sectional view of the connector.

Channel connector 100, comprising channel connector 102 and elongate bar 106 is shown in FIGS. 8A to 8E. FIG. 8B shows a cross section of the connector with the bar in place. The connector illustrated in these figures is about 1 inch (2.5 cm) wide and about 5/8 inch (1.6 cm) high though any desired dimensions can be used for this connector. The length of the connector also may be any desired length. Connector 100 typically comprises rigid polymeric material such as polyvinyl chloride or polyethylene copolymer. It also may comprise fiberglass. Connector 100 may be formed by extruding a suitable material into the desired shape. Connector 100 includes elongate channel connector 102 having first and second sides that define channel 104. This channel is configured to receive a reinforcing geogrid. Typically an end of the geogrid is laid into the channel and elongate connector bar 106 is placed into the channel. The geogrid thus is held in place by elongate connector bar 106.

Connector 100 may have the same length as the length of groove 30 in block 1a. This is a convenient length to use during installation of the geogrid in a retaining wall. However, it may be desirable to use a connector less than the length of groove 30 in block 1a, or a connector having a length that spans two or more blocks, i.e., twice or more the length of groove 30 in block 1a.

Figure 9A:
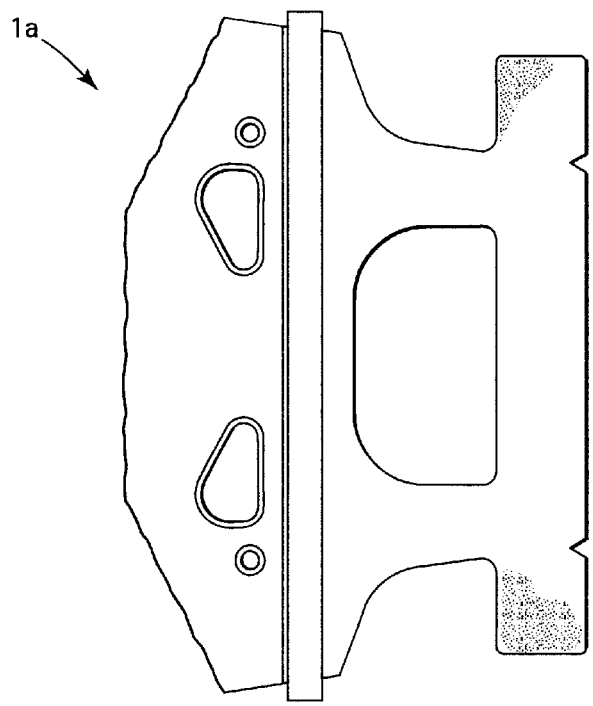
FIG. 9A is a top view of the connector of FIG. 8A in place in the block shown in FIGS. 1 to 5.
Figure 9B:
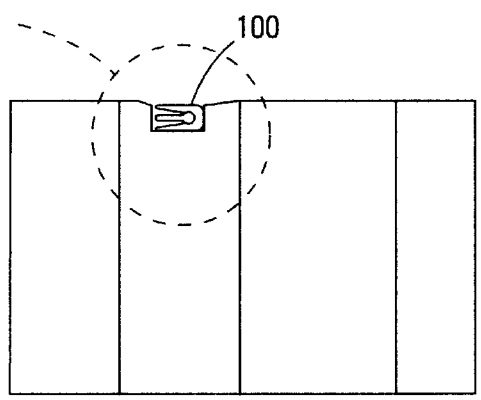
FIG. 9B is a side view of the block with the connector.
Figure 9C:
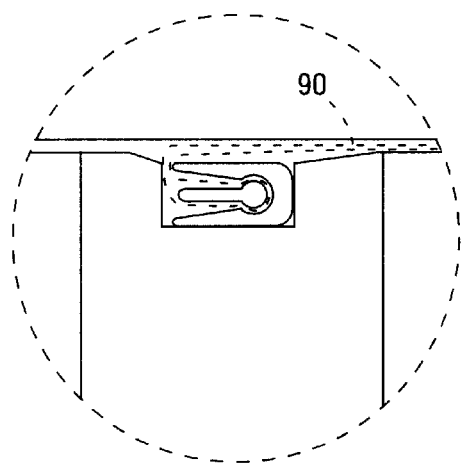
FIG. 9C is a detail view of FIG. 9B, with geosynthetic material in place.

FIGS. 9 and 10 illustrate the use of connector 100 with flexible geosynthetic material and show that the connector can be used in more than one configuration. In FIG. 9A, the connector is positioned so that the connector's channel faces the front of the block. This is shown in side view in FIG. 9B. FIG. 9C shows a detailed side view of geosynthetic material 90 in place in the connector in the block. Another block in a retaining wall lies over this block. Geofabric 90 wraps around connector bar 106 which holds the geofabric securely in connector channel 104.

Figure 10A:
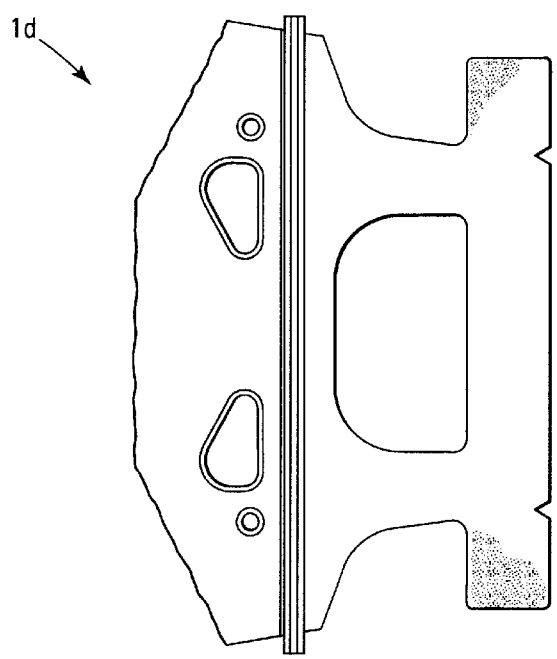
FIG. 10A is a top view of the connector in place in an alternate embodiment of the block.
Figure 10B:
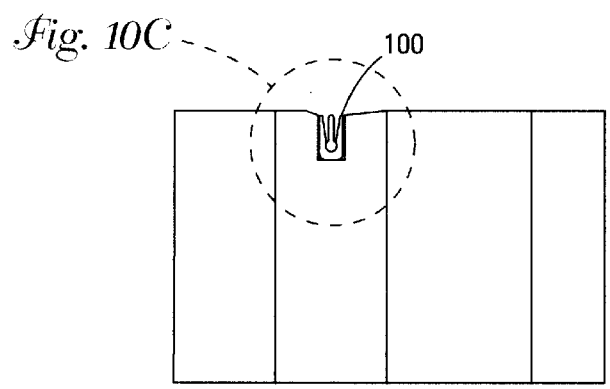
FIG. 10B is a side view of the block with the connector.
Figure 10C:
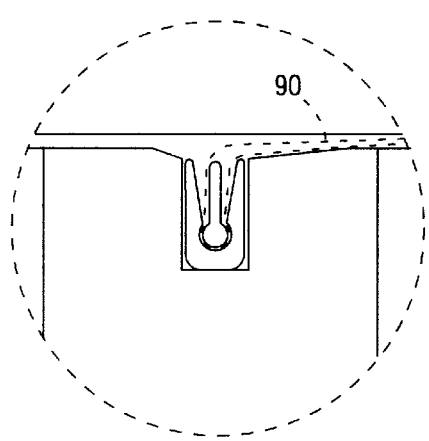
FIG. 10C is a detail view of FIG. 10B, with geogrid in place.

FIG. 10A shows block 1d. Block 1d is the same shape and has the same features as block 1a, but groove 30d is narrower than groove 30 in block 1a. Connector 100 fits into groove 30d such that the connector faces upward, i.e., the channel opens to the top of the block, as shown in the side view in FIG. 10B. FIG. 10C is a detail side view with geosynthetic material 90 in place within the connector. It is useful to compare FIG. 9A with FIG. 10A. In both situations, the geosynthetic material or geofabric is laid into the channel of the channel connector and then bar 106 is moved into position in the channel, thus providing a positive mechanical connection for the geofabric to the blocks in the retaining wall.

Figure 8C:
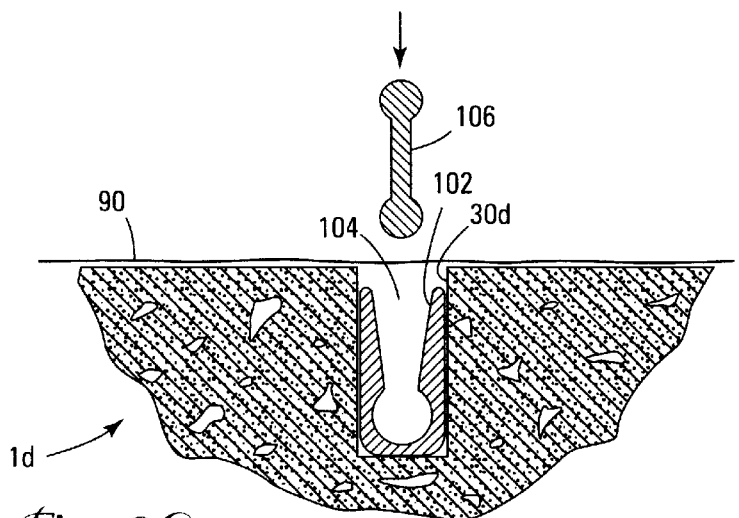
FIGS. 8C to 8E are sectional views showing placement of the connector bar into the connector channel with geosynthetic material in place.
Figure 8D:
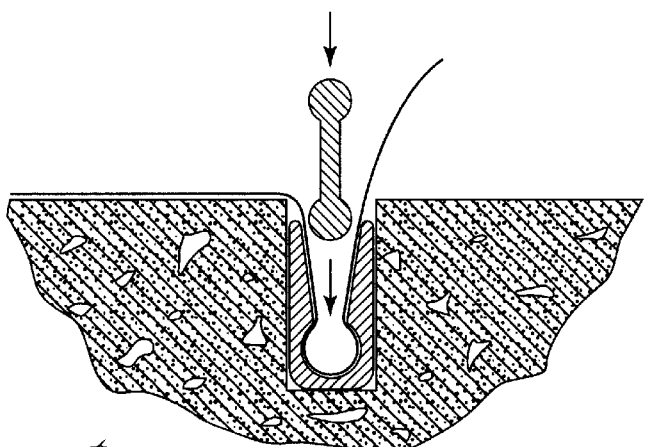
Figure 8E:
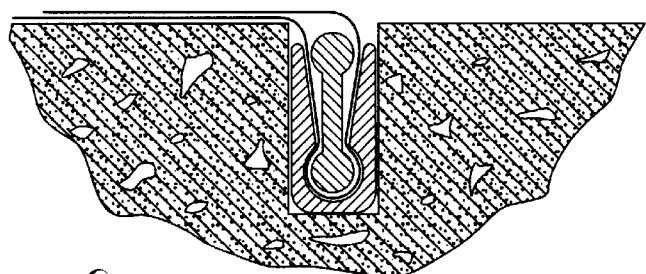

FIGS. 8C to 8E show a detail view of groove 30d in block 1d. These figures illustrate the placement of connector bar 106 into connector channel 104 with geosynthetic material 90 in place. The connector bar moves in the direction of the arrow to secure the material within the channel.

Figure 11:
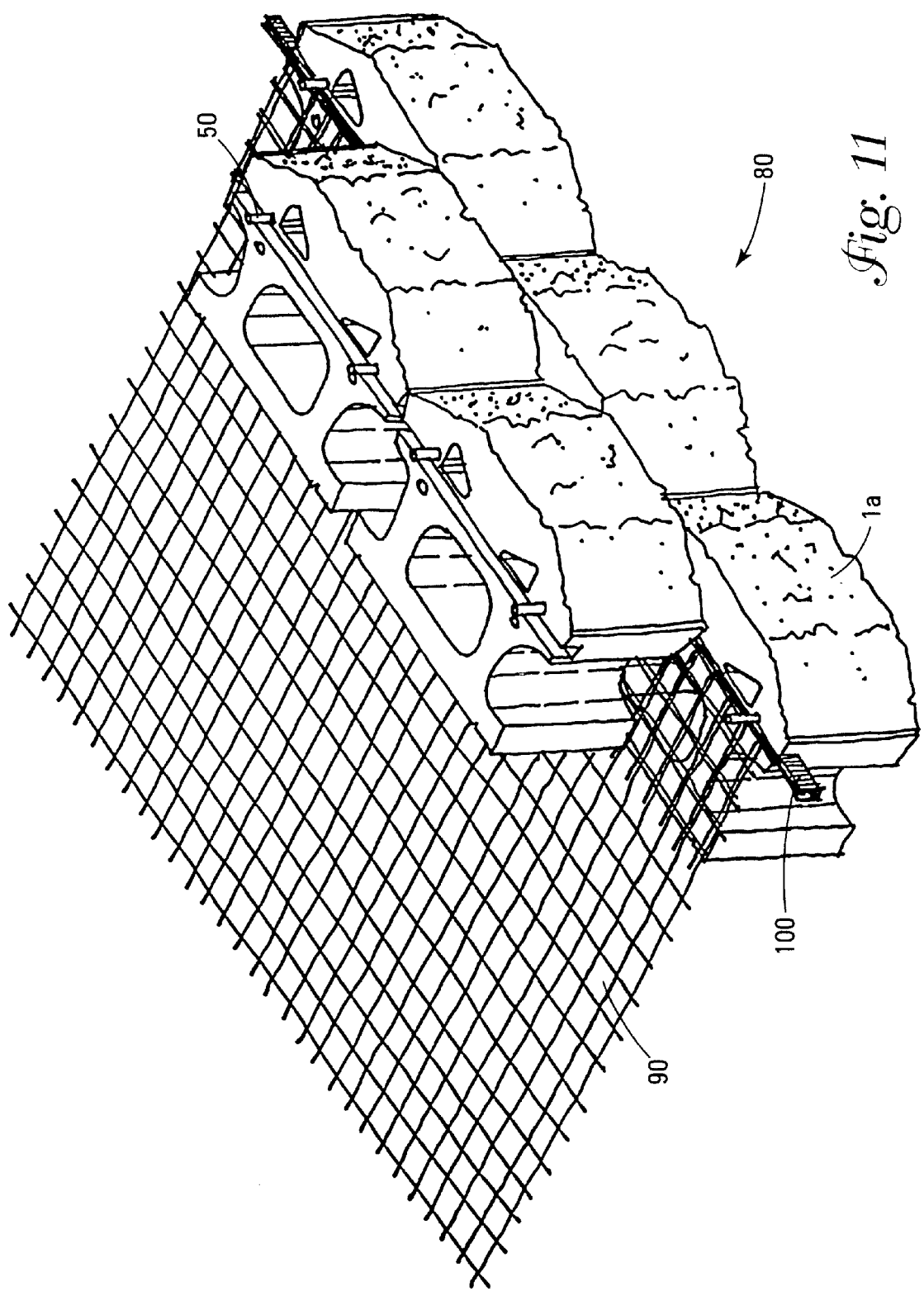
FIG. 11 is a perspective view of a partial retaining wall with connectors and geosynthetic material in place.

When the geosynthetic material is installed, it extends rearwardly into the fill behind a wall, thus anchoring the wall against forces tending to topple the wall forward, as illustrated in FIG. 11. Partially constructed wall 80 is shown. The three blocks of the lower course are interconnected by means of pins 50 in pin holes 16 and 17 that engage pin receiving cavities 18 and 19 in the two blocks of the upper course. Geosynthetic material 90 extends behind the wall. It is laid into place between the lower and upper course. The channel connector is placed into groove 30 and one end of the material is laid into channel 104 of channel connector 100 and elongate bar 106 is moved into place to hold the material firmly. Typically, tension is applied to the geosynthetic material. The channel connector of this invention prevents a structurally weak material, such as polyester web or fabric, from pulling away from connector. The advantage to the channel connector is that it holds the material firmly across the full length of one or more blocks, and the material does not slip out of or tear away from the channel connector.

Figure 12A:
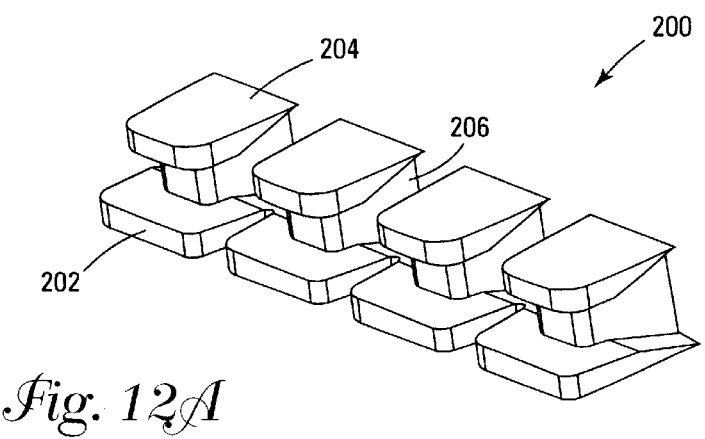
FIG. 12A is a perspective view of an alternate connector of this invention and FIG. 12B is a top view of the connector with apertured geogrid in position.
Figure 12B:
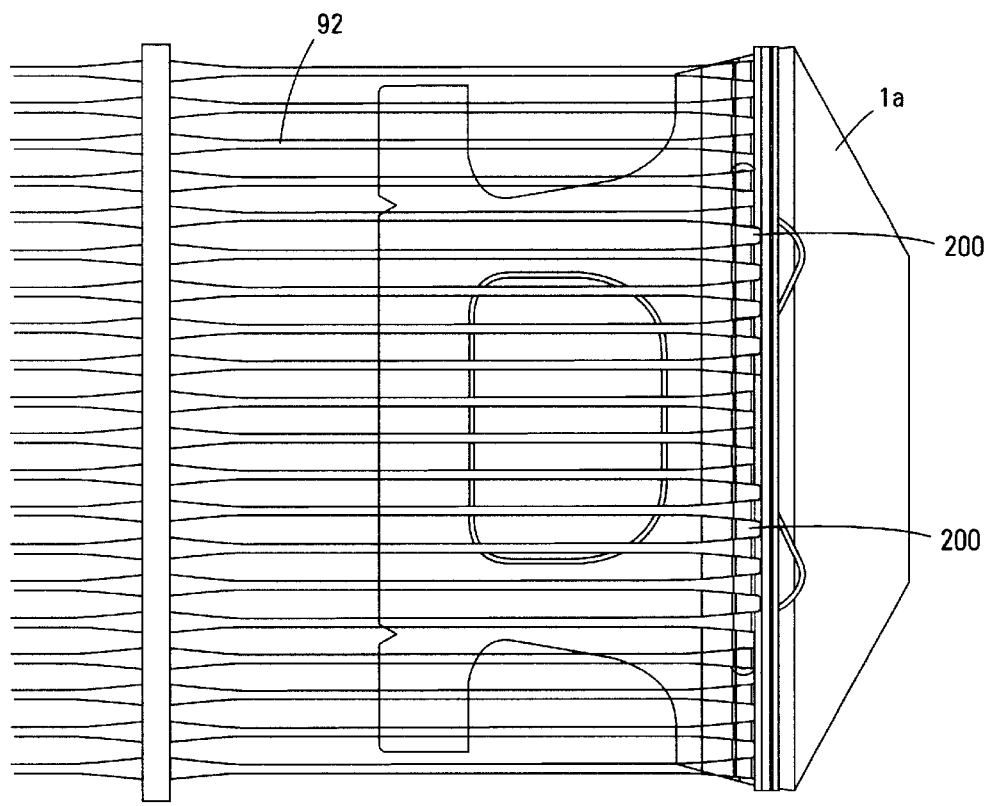
Figure 13A:
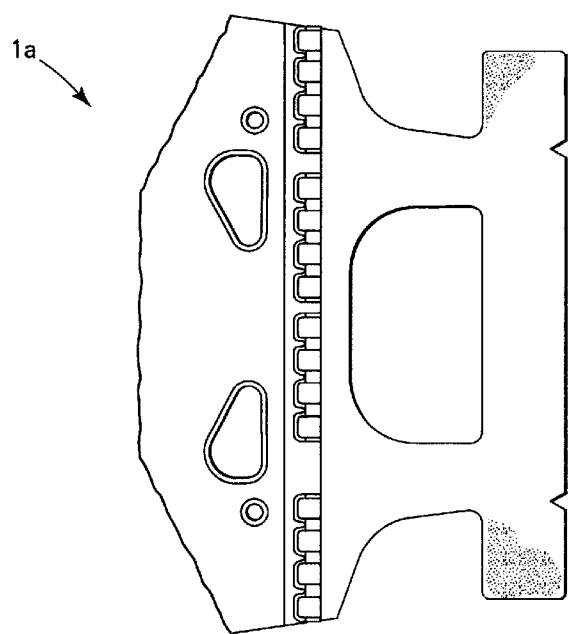
FIG. 13A is a top view of the connector of FIG. 12A in the block shown in FIGS. 1 to 5.
Figure 13B:
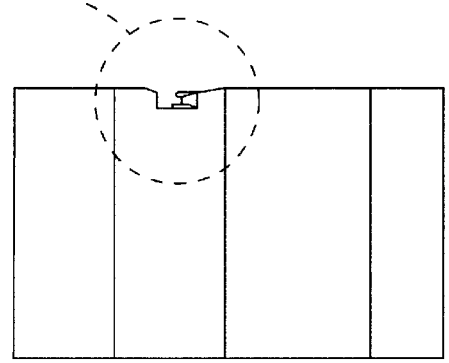
FIG. 13B is a side view of the block.
Figure 13C:
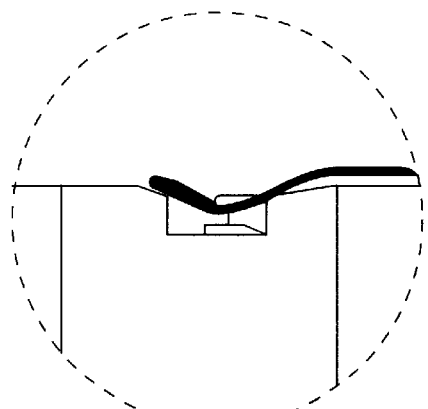
FIG. 13C is a detailed view showing apertured geogrid held in the connector.

FIG. 12A shows a perspective view of an alternate connector and FIG. 12B shows two of connectors 200 in groove 30a of block 1a. The connectors engage geogrid 92 and hold it in place in the block. This connector is configured to be used with relatively rigid apertured geogrid, such as the HDPE geogrid described above. Connector 200 comprises a plurality of spaced-apart projections extending from a base portion. Connector 200 can also be viewed as being made of multiple identical segments. Top portion 204 and intermediate spacing portion 206 extend from base portion 202. Connector 200 shown in FIG. 12A comprises four top portions and intermediate spacing portions, though clearly any desired number of these could be used. It is found that the size of connector shown in FIG. 12A is convenient for use when installing the geogrid. Connector 200 is configured to sit in groove 30. FIG. 13A shows a plurality of connectors 200 in the block and FIG. 13B shows the side view of a connector in groove 30 of the block as shown in FIGS. 1 to 5. FIG. 13C shows a detailed side view of geogrid 92 held in the connector. In contrast to connectors previously used in the industry, this connector is configured to engage the geogrid so that the connector does not fall out of the geogrid during installation. That is, top portions 204 are sufficiently wider than the intermediate spacing portions 206 to be supported by the geogrid. In this way, during construction of a wall, the connectors can be engaged with the geogrid and will remain in proper engagement when the connectors are laid in the grooves of the blocks.

Figure 14:
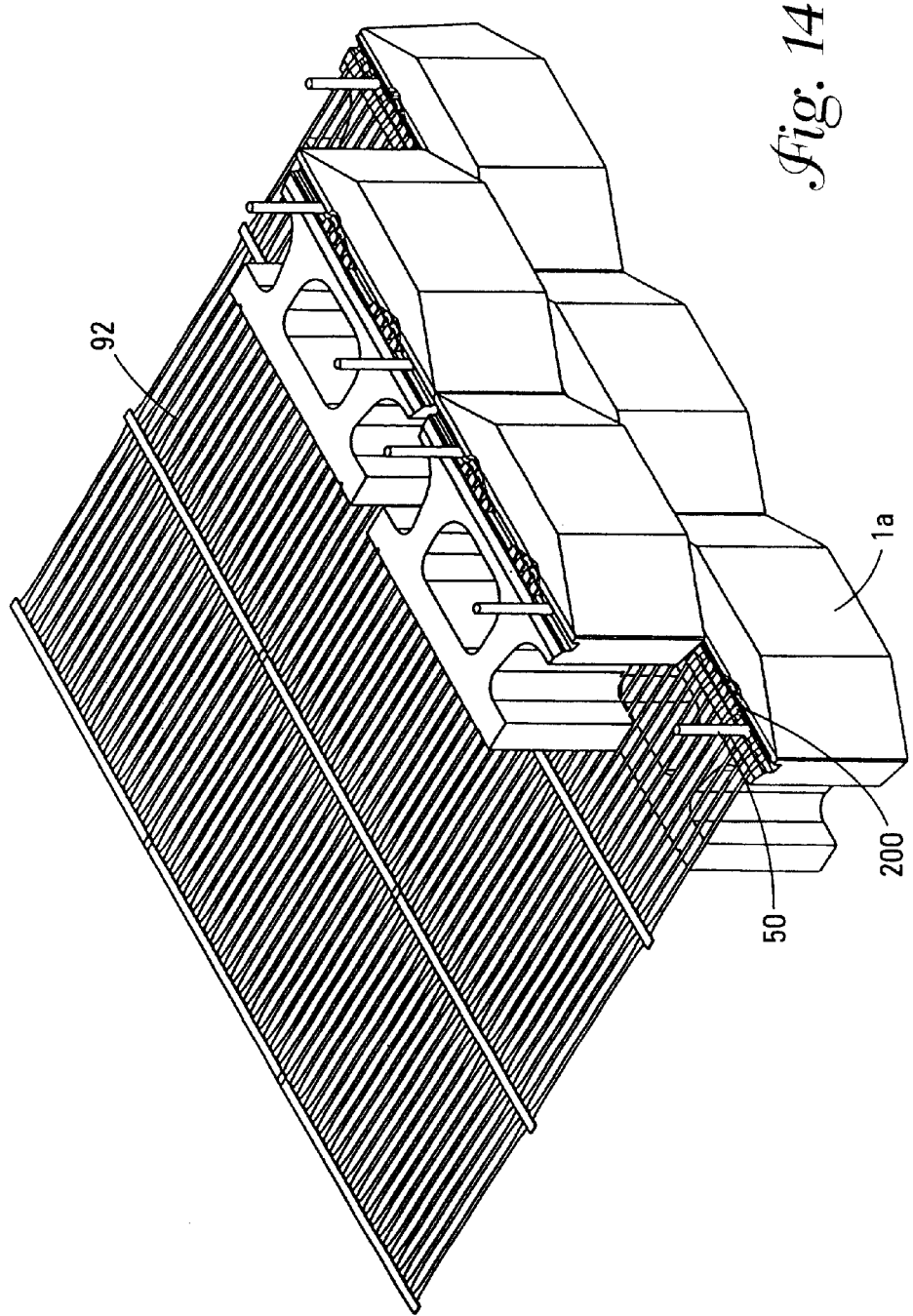
FIG. 14 is a perspective view of a partial retaining wall with connectors and geogrid in place.

Both the apertured, relatively rigid geogrid of FIGS. 12B and 13C and the more flexible geofabric of FIGS. 9C, 10C, and 11 are installed in a retaining wall in a manner similar to that disclosed in Forsberg, U.S. Pat. No. Re. 34,134. The geosynthetic material extends into the fill behind the wall, as illustrated in FIG. 14. The geosynthetic material helps anchor the wall. FIG. 14 illustrates a portion of a retaining wall with relatively rigid geogrid 92 held in place by connectors 200 positioned in the grooves of the blocks. The blocks are interconnected in the wall by means of pins 50 that fit in pin holes 16 and 17 in the blocks of a first course that engage pin receiving cavities 18 and 19 in blocks of a second (upper) course. The advantage to connector 200 is that it is configured to remain in an apertured, relatively rigid, geogrid during placement of the geogrid/connector combination into the grooves of the wall blocks, thus facilitating its placement.

Although particular embodiments have been disclosed herein in detail, this has been done for purposes of illustration only, and is not intended to be limiting with respect to the scope of the appended claims, which follow. In particular, it is contemplated by the inventor that various substitutions, alterations, and modifications may be made to the invention without departing from the spirit and scope of the invention as defined by the claims. For instance, the choice of materials or variations in the shape or angles at which some of the surfaces intersect are believed to be a matter of routine for a person of ordinary skill in the art with knowledge of the embodiments disclosed herein.

What is claimed is:

1. A retaining wall comprising:
   a plurality of blocks including at least one lower course and at least one upper course, at least one block having a top surface defining a groove, the groove being substantially perpendicular to a vertical plane of symmetry;
   an apertured geogrid; and
   a connector including a base portion sized to be accommodated within the groove of at least one block such that a bottom surface of the base portion is supported by a bottom surface of the groove and a plurality of spaced-apart projections extending upwardly from the base portion when the base portion is accommodated in the groove, each projection including a top portion and a spacing portion intermediate the base portion and the top portion, each spacing portion having a first width, each top portion having a second width, the second width being greater than the first width, the projections being spaced and sized to be accommodated within apertures of the geogrid such that the geogrid is retained between the top portion and the at least one block in the retaining wall when the connector is engaged in the apertured geogrid.

2. The retaining wall of claim 1 wherein the apertured geogrid comprises high density polyethylene.

3. The retaining wall of claim 1 wherein the connector comprises four spaced-apart projections extending from the base portion.

4. A retaining wall comprising:

a plurality of blocks including at least one lower course and at least one upper course, each block of the plurality of blocks having opposing front and rear faces, at least a portion of the front face being substantially parallel to the rear face, the at least one block having a top surface defining a groove, the groove being substantially parallel to the rear face;

an apertured geogrid; and a connector including a base portion sized to be accommodated within the groove of at least one block such that a bottom surface of the base portion is supported by a bottom surface of the groove and a plurality of spaced-apart projections extending upwardly from the base portion when the base portion is accommodated in the groove, each projection including a top portion and a spacing portion intermediate the base portion and the top portion, each spacing portion having a first width, each top portion having a second width, the second width being greater than the first width, the projections being spaced and sized to be accommodated within apertures of the geogrid such that the geogrid is retained between the top portion and the at least one block in the retaining wall when the connector is engaged in the apertured geogrid.

5. The retaining wall of claim 4 wherein the apertured geogrid comprises high density polyethylene.

6. The retaining wall of claim 4 wherein the connector comprises four spaced-apart projections extending from the base portion.

\* \* \* \* \*